J. M. BOYD.
HAY SLING.
APPLICATION FILED JAN. 8, 1906.

939,469.

Patented Nov. 9, 1909.
2 SHEETS—SHEET 1.

Witnesses:
A. J. Ricker
Geo. B. Tobey.

Inventor:
John M. Boyd.

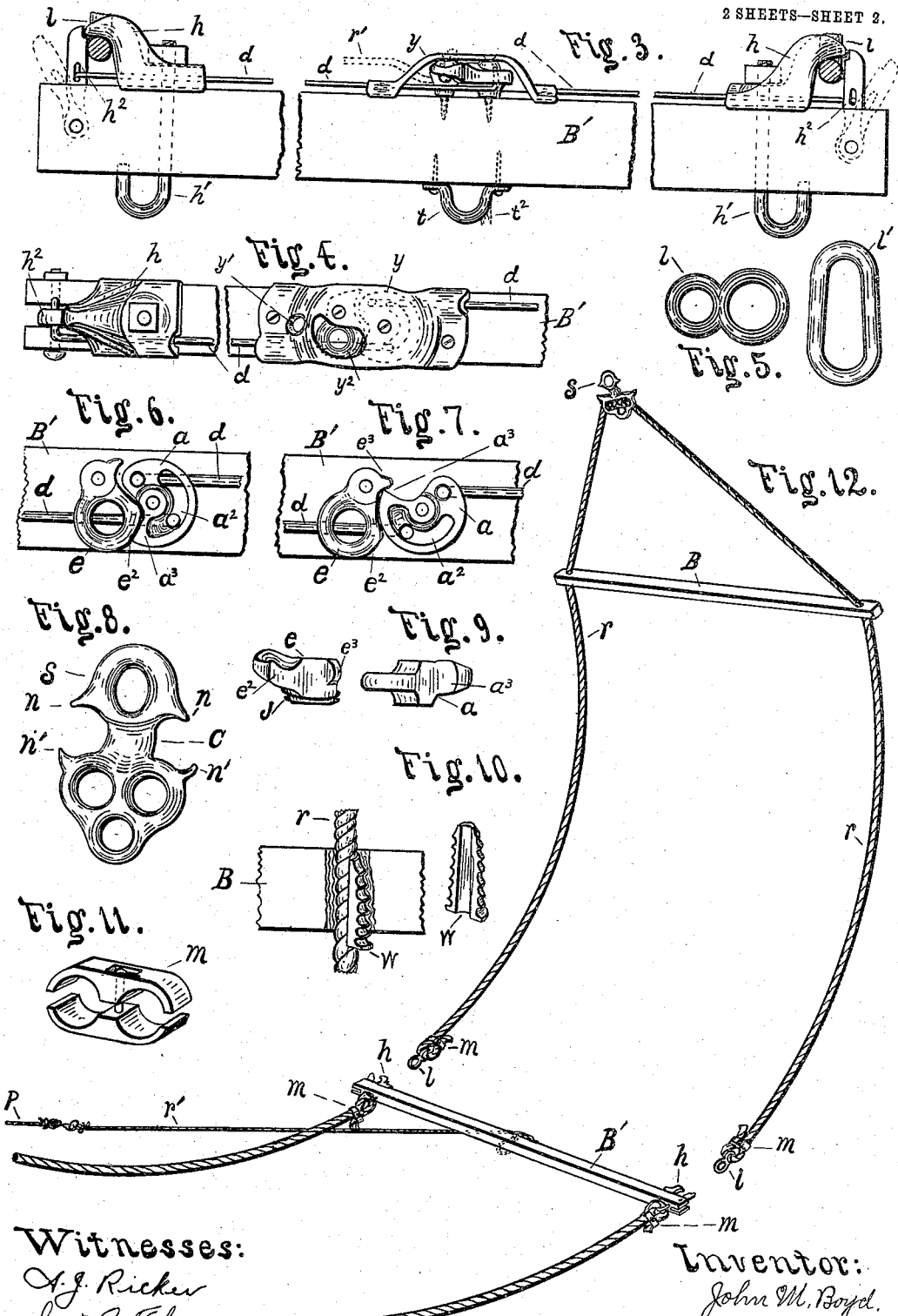

UNITED STATES PATENT OFFICE.

JOHN M. BOYD, OF FOND DU LAC, WISCONSIN.

HAY-SLING.

939,469.  Specification of Letters Patent.  Patented Nov. 9, 1909.

Application filed January 8, 1906.  Serial No. 295,094.

*To all whom it may concern:*

Be it known that I, JOHN M. BOYD, a citizen of the United States, residing at Fond du Lac, in the county of Fond du Lac and State of Wisconsin, have invented certain new and useful Improvements in Hay-Slings, of which the following is a specification, such as will enable others skilled in the art to which it appertains to make and use the same, reference being had to the accompanying drawings, and to the letters and figures marked thereon, which form a part of this specification.

My invention relates to slings for unloading hay, grain, etc., from a wagon, and carrying it off to a desired place of deposit, and has for its object to provide a sling of simple and improved construction, not liable to get out of order easily, and adapted to handle short or fine hay, grain, etc., without spilling it out at the sides so easily as the ordinary construction, and to be perfectly reversible and adapted to use either side up, and to be easily and quickly adjusted to different lengths, etc., and it consists in the construction, combination, and arrangement of the different parts, as hereinafter set forth in the specification and pointed out in the claims.

Figure 1:
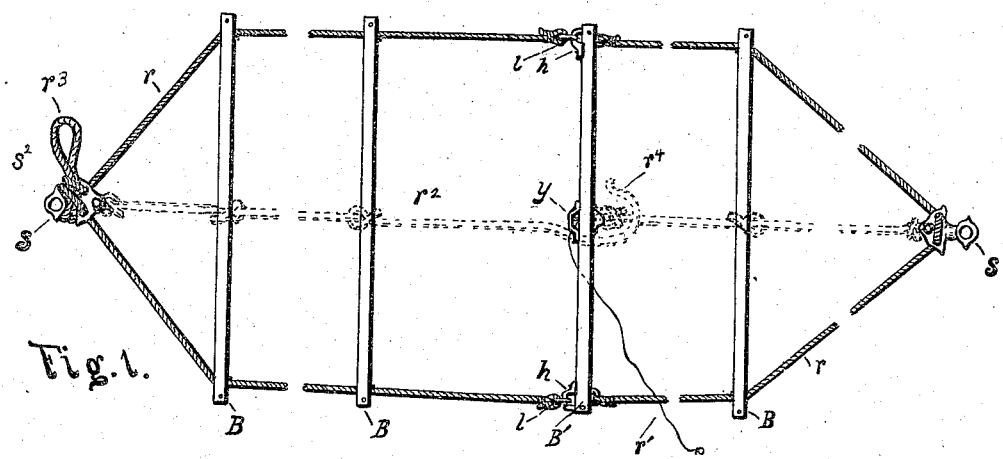
Figure 2:
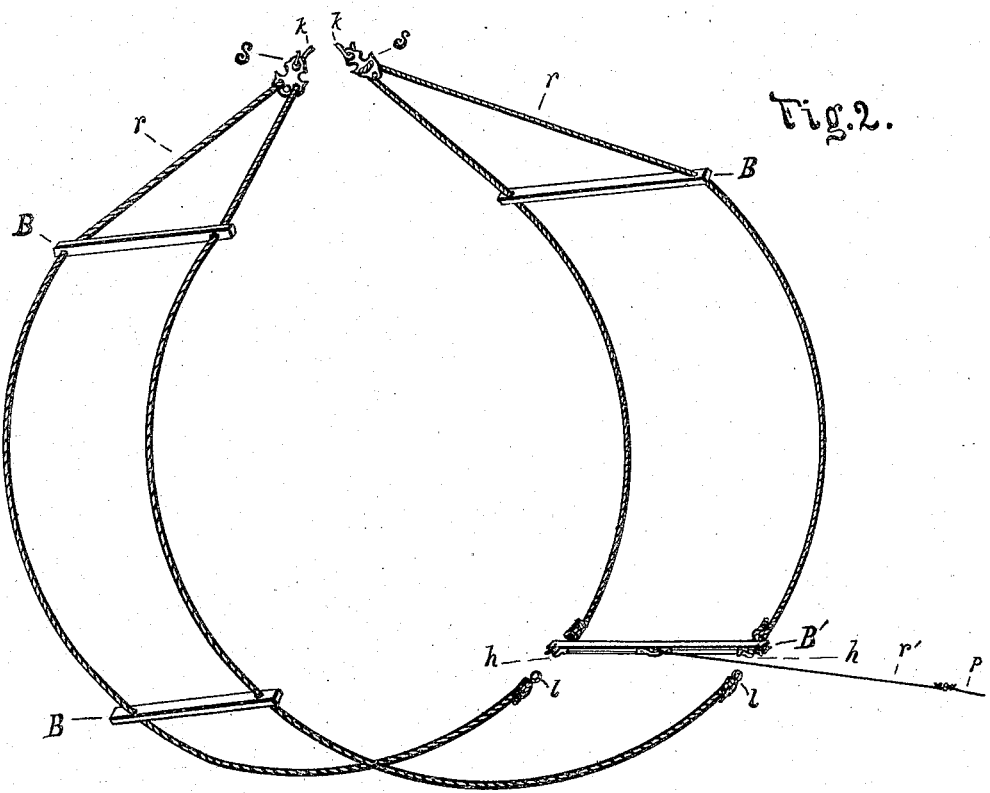

In the drawings Figure 1, is a plan view of my improved sling. Fig. 2, shows the same in position as when carrying a load, just as it had been tripped to discharge the load. Fig. 3, is a side elevation of the locking bar, showing the locking mechanism. Fig. 4, is a plan or edge view of the same, looking down upon the locking mechanism from above as in Fig. 3, one end of the locking bar being removed, (the ends and center of the bars only, which carry the locking mechanism, being shown in Figs. 3 and 4, as will be understood, the bars being made of different lengths as desired.) Fig. 5, is a view showing connecting links for connecting the ropes on one side of the sling with the hooks on the locking bar on the opposite side. Figs. 6, and 7, are enlarged views showing the locking device in different positions. Figs. 8, 9, 10, and 11, are detail views of different parts, and Fig. 12, is a view of one end of the sling, somewhat enlarged, when arranged with three cross-bars on one side of the sling, and one on the other, showing the same in about the position it assumes just after being tripped to discharge its load, as it is flying open, as will be readily understood, all as hereinafter set forth.

In the accompanying drawings, in which similar characters of reference indicate corresponding parts, S. is the sling head, by which the ropes $r.$ $r.$ on each side with their load are lifted, B. B. B. are cross-bars or spreaders for holding the ropes apart, B'. is the locking bar or spreader carrying the locking mechanism for connecting the two sides or parts of the sling, $h.$ $h.$ are hooks attached near each end of said bar to engage and hold links $l.$ $l.$ (or $l'.$ $l'.$) attached on the ends of the ropes on the opposite side of the sling, $h^2.$ $h^2.$ are dogs, levers, or fingers, pivoted at one end in slots in the ends of the bar, (see Fig. 4.) and adapted to close said hooks $h.$ $h.$ and hold said links $l.$ $l.$ (shown partly in section in Fig. 3.) in place while the load is being carried, etc., said dogs or fingers $h^2.$ $h^2.$ being held in place by rods $d.$ $d.$ hooked into slots in said fingers, and running through a groove or bearing through or on the under side of said hooks $h.$ $h.$, and being connected with a locking device at or near the center of the locking bar, endwise, whereby they may be locked in place to hold said fingers and links in place in said hooks, as shown in full lines in Fig. 3., or allow said fingers to tip out, as shown in dotted lines in said figure, to allow the links to slip out when the center lock is tripped. $y.$ is a cover or bridge (see Figs. 3. and 4.,) adapted to cover the center locking mechanism to protect it, and to hold the parts in place, and also to form guides or bearings near the inner ends of said rods $d.$ $d.$ one of said rods being hooked at the inner end into a hole at one side of a locking piece or device, $a.$ Figs. 6. and 7., and the end of the opposite rod being hooked into a slot $a^2.$ running around to the opposite side of said locking piece $a.$, and a dog $e.$ being pivoted at one side of said locking or connecting piece $a.$ and provided with a shoulder $e^2.$ adapted to engage with a relatively flat part or shoulder $a^3.$ on said locking piece $a.$ and lock the same, as in Fig. 6., drawing the rods $d.$ $d.$ closer up and locking the fingers $h^2.$ $h^2.$ at each end of the bar, thus holding the links $l.$ $l.$ in place, or when tripped, preferably by means of the small rope or cord $r'.$ (Figs. 1, 2, and 12, or shown at one end of bridge or cover $y.$ by dotted lines in Fig. 3.,) which passes through the hole $y'$. in one end of said bridge or cover $y$., (see Fig. 4.) and connects with the ring or opening in said dog $e$., a slot or opening $y^2$. being preferably provided on the upper side of said cover to allow the upper end or knot at inner end of cord to pass through back and forth without binding, as in said Fig. 4., the tension of the links $l$. $l$. pulling against the slanting edges of the hooks $h$. $h$., and against said levers or fingers $h^2$. $h^2$., will pull on the rods $r$. $r$. and force said locking piece around into the position shown in said Fig. 7., thus allowing said fingers $h^2$. $h^2$. to tip out, as shown in dotted lines in Fig. 3., and release said links $l$. $l$., thus allowing the load to be discharged, said locking bar B'. being preferably connected to the ropes on one side of the sling by means of the hooked ends of the same bolts $h'$. which hold the hooks $h$. in place on the opposite side at each end of the bar, as in Figs. 1, 2, 3, and 12., as will be readily understood, the other cross bars being simply used as spreaders, in the ordinary manner, except that the ropes pass through them instead of at one side, and are fastened in place by means of castings or wedges $w$. driven into the cross bar at one side of the rope, being preferably formed as in Fig. 10. to hold it securely in place.

In connecting the opposite sides of the sling together, as when setting for a load, the link or coupling $l$. should be put in place and the finger $h^2$. closed first on the end of the bar carrying the rod $d$. which connects with the slot $a^2$. in the locking piece $a$., as the inner hooked end of said rod will slide along in said slot without operating said lock $a$., while as the finger $h^2$. on the opposite end of the bar is closed, the rod connecting with the hole in the lock $a$. from that end, and on the opposite side of said locking piece $a$. from the outer end of the slot $a^2$., will force said locking piece around into locking position, as in Fig. 6., and the locking dog $e$. being operated by a spring $j$. (see Fig. 9.) coiled around its lower part, will spring into position and automatically lock said locking piece, as in said Fig. 6, thus locking both ends of the bar at once, and the incline of the engaging shoulders or parts $a^2$. $e^3$. of this locking piece and locking dog may be changed to cause it to trip easy or hard, as desired, as will be understood. In Fig. 9, are shown side elevations or detail views of this locking piece $a$. and locking dog $e$., showing the shoulders or engaging parts $a^3$. $e^2$. and spring $j$., also a small extension or lug $e^3$. on the locking dog to prevent the locking piece $a$. from flying around too far as it is tripped, as in Fig. 7. The locking link may preferably be formed double, as at $l$. Fig. 5., the small ring or hole being adapted for the rope, and the larger one to engage with the hook $h$., thus preventing the rope from slipping on the link, and holding it in place, or it may be made in the shape of an oblong or other style of link, wider at one end than the other if desired, as at $l'$. Fig. 5., though this form is more liable to slip out of place in the rope.

Fig. 8. is a detail view of the sling head S., formed with an upper part adapted to be hooked onto a sling pulley or other hook for raising the sling in the usual manner, as at $k$. $k$. Fig. 2., an opening being provided for said hook as shown, and a lower part provided with several holes or openings through which ropes may be passed, as in Figs. 1, 2, and 12., said upper and lower parts being connected by an extension or neck C., around which the doubled end of the rope $r$. may be coiled to take up slack and shorten the sling, as at $S^2$. Fig. 1., the looped end $r^3$. being allowed to project out at one side as shown, or looped back around the sling head, or around one of the ropes below the sling head, or used to hitch to, as desired, small projections or points $n$. $n'$. (Fig. 8.,) being also provided at each side of said head to hold said rope in place around said neck when working, and the tension of said rope around said neck will hold tightly when the load is applied, the looped end passing underneath the other, through the hollowing space in front of the neck C., and it may be easily released or changed to different lengths when desired, as will be readily understood. The ropes $r$. $r$. may be rigidly fastened at their lower ends to the hooked bolts $h'$. $h'$. at the ends of the lock bar B'., or to the links $l$. $l$., in the usual manner, as in Figs. 1. and 2., but I prefer to fasten them by means of the clamping device, or clamps, $m$., shown in Figs. 11 and 12., which are clamped on the ropes as in said Fig. 12., as by means of these clamps the ropes may be easily released and the lock bar changed over to the opposite end of the sling, leaving the loose ends of the rope on the short side of the sling, as in said Fig. 12., in which figure said lock bar and links are changed over to the opposite side of sling from that shown in Fig. 2. The object of this change is to allow a load to be discharged in much less space without catching the cross bars or spreaders, especially when a mow is nearly full, as when arranged as shown in Fig. 12., (in which only about the forward half or less of the sling is shown, as will be understood,) when the hay carrier is traveling forward over the mow with the sling in the usual manner, and the trip cord $r'$. is pulled from the rear, (being connected to a longer cord P., reaching to the operator in the usual manner,) and the sling is tripped, the lock bar B'. will naturally be pulled back by said trip-cord $r'$. toward the operator, clearing it from under the load as it drops, while the short free ropes will naturally swing forward out from under the load, or if dragging on hay or other material already deposited, and caught under the load as it discharges, will be pulled out as the carrier runs forward, and much easier than if a cross bar or spreader was attached at their lower ends in the usual manner, as will be readily understood, thus making it much more convenient for filling close up in a mow, etc.

The operation of the several parts, and of the device as a whole, will be readily understood from the foregoing description.

I am aware that several modifications may also be made of the several parts, and therefore wish it distinctly understood that I explicitly reserve to myself all such modifications, combinations, constructions and arrangements of the parts, as properly come within the scope of my invention.

What I claim as my invention and desire to secure by Letters Patent is—

1. In a hay sling, in combination with the ropes arranged in two sections, cross bars or spreaders attached to each section suitable self releasing hooks rigidly secured to the inner end cross bar of one section, with their ends projecting outwardly and opening in opposite directions, means whereby the opposite section may be coupled with said hooks between the adjoining cross bars of the two sections, means for closing said hooks, and means whereby the coupling may be locked in both hooks, or released, simultaneously, substantially as and for the purposes set forth.

2. In a hay sling, in combination with the ropes arranged in two sections, a cross bar or spreader attached to one section and provided with rigid inclined or self-releasing hooks at or near each end, opening outwardly, or toward each end of said bars, means whereby the opposite section may be coupled with said hooks, means for closing the mouth or opening in said hooks, and means whereby the same may be locked or released simultaneously, substantially as and for the purposes set forth.

3. In a hay sling, a spreader or locking bar provided with rigid inclined or self-releasing hooks attached near each end, short levers or fingers pivoted in the ends of said bar, and adapted to close the mouths of said hooks to secure the coupling links, rods connecting said fingers with a central locking mechanism, and a spring actuated dog adapted to automatically lock said mechanism, substantially as and for the purposes set forth.

4. In a hay sling, in combination with a suitable locking bar or spreader, provided with suitable couplings at each end, rods connecting said coupling mechanism with a central locking mechanism, a pivoted locking piece connecting the inner ends of both rods, and a pivoted dog adapted to lock said locking piece when in the proper position, substantially as set forth.

5. The combination of the locking bar B'., hooks $h.$ $h.$ attached at or near each end of said bar, fingers $h.^2$ $h.^2$ pivoted in slots provided in the ends of said bar, rods $d.$ $d.$ connecting said fingers with the central locking piece $a.$ a dog $e.$ adapted to lock said locking piece, and means, as $h'$, $h'.$, whereby ropes may be attached to said locking bar, substantially as and for the purposes set forth.

6. In a hay sling, the head S., formed with an upper part provided with an annular opening or ring formed solidly thereon whereby it may be attached to the elevating device, a lower part provided with several openings whereby ropes may be attached, and a smaller central part or neck C. preferably curved and connecting said upper and lower parts, around which the rope may be coiled to take up slack, substantially as and for the purposes set forth.

7. In a hay sling, in combination with the ropes of the sling, the head formed with a central part or neck C., and horns or projections $n.$ $n'.$ projecting out at each side thereof, with openings below whereby said ropes may be attached, substantially as and for the purposes set forth.

8. In a hay sling, in combination with the cross bars or spreaders, ropes running through holes in the same, and straight tapering wedges driven in parallel with and at one side of said ropes to lock the same in the spreaders, substantially as set forth.

9. In a hay sling, the combination of the spreader B., rope $r.$ running through a hole slightly larger than said rope, crosswise through said spreader, and a cast concave wedge $w.$ driven in said hole at one side of said rope, with its concave face parallel to said rope from end to end, substantially as and for the purposes set forth.

10. In a hay sling, in combination with the ropes of the sling, and the locking bar, the clamp $m.$, by means of which ends of said ropes may be securely held, or easily and quickly released to change the locking bar from one side of the sling to the other, substantially as set forth.

11. The combination of the locking bar B'., hooks $h.$ $h.$ at or near each end, links $l.$ $l.$ attached to the ropes of the opposite section, and clamps $m.$ whereby the ends of the ropes may be secured to said locking bar, and to said links $l.$ $l.$, substantially as and for the purposes set forth.

12. In a hay sling, in combination with the ropes and spreaders, a central rope, as indicated by dotted or broken lines $r^2.$ adapted to run across from one section to the other, and suitable separate means, as indicated by dotted or broken lines at $t^2.$, for holding the free end of said central rope while the others are coupled, but releasing same as the others uncouple and the locking bar turns down, substantially as set forth.

13. In a hay sling, in combination with the ropes of the sling, a locking bar or spreader provided with means at each end whereby the ends of said ropes may be attached or detached at will, a central locking means at or near the longitudinal center of said bar or spreader, and on one side of said bar, and means on the opposite side of said bar, as a ring or loop, whereby a central rope may be attached when desired, substantially as and for the purposes set forth.

In testimony whereof I hereby affix my signature in presence of two subscribing witnesses this 5th day of January 1906.

JOHN M. BOYD.

Witnesses:
A. J. RICKER,
GEO. B. TOBEY.